(12) United States Patent
Johnston

(10) Patent No.: US 9,039,209 B1
(45) Date of Patent: May 26, 2015

(54) DURABLE AND EASILY ATTACHABLE AND DETACHABLE RETROREFLECTIVE PLASTIC STRIPS FOR TRUCK TRAILERS

(71) Applicant: Eric Lee Johnston, Poland, OH (US)

(72) Inventor: Eric Lee Johnston, Poland, OH (US)

(73) Assignee: Eric Lee Johnston, Poland, OH (US)

( * ) Notice: Subject to any disclaimer, the term of this patent is extended or adjusted under 35 U.S.C. 154(b) by 289 days.

(21) Appl. No.: 13/627,014

(22) Filed: Sep. 26, 2012

(51) Int. Cl.
*G02B 5/12* (2006.01)
*B60Q 1/30* (2006.01)
*G02B 5/136* (2006.01)

(52) U.S. Cl.
CPC ............... *B60Q 1/305* (2013.01); *G02B 5/136* (2013.01)

(58) Field of Classification Search
CPC ............ G02B 5/12; G02B 5/136; B60Q 1/30; B60Q 1/32; B60Q 1/307; B60Q 1/323
USPC ................................... 359/515, 546, 548, 549
See application file for complete search history.

(56) References Cited

U.S. PATENT DOCUMENTS

| | | |
|---|---|---|
| 6,431,605 B1 | 8/2002 | Miller et al. |
| 6,446,571 B1 | 9/2002 | Sloot |
| 6,451,408 B1 | 9/2002 | Haunschild et al. |
| 6,604,724 B2 | 8/2003 | Hawes et al. |
| 6,677,028 B1 | 1/2004 | Lasch et al. |
| 7,011,418 B2 | 3/2006 | Adams |
| 7,410,700 B2 | 8/2008 | Wang |
| 7,805,870 B2 | 10/2010 | Calderwood |
| 7,905,611 B1 | 3/2011 | Bourget |
| 2008/0055725 A1* | 3/2008 | Dornbos ....................... 359/548 |

* cited by examiner

*Primary Examiner* — Euncha Cherry

(57) ABSTRACT

A retroreflective plastic strip having conspicuity tape on its outer surface and having flanges along each lateral edge for spacing the strip from the surface of an under-ride bumper on a truck trailer. The strip has means such as zip ties or pop rivets for detachably securing the strip on the bumper to comply with Federal regulations.

14 Claims, 2 Drawing Sheets

DURABLE AND EASILY ATTACHABLE AND DETACHABLE RETROREFLECTIVE PLASTIC STRIPS FOR TRUCK TRAILERS

BACKGROUND OF THE INVENTION

The present invention relates to the Federal mandate that commercial trailers and semitrailers must be equipped with retroreflective sheeting or an array of reflective reflector in a red and white pattern on them to make the vehicles more readily visible to drivers of other vehicles (see Federal Motor Vehicle Safety Standard No. 108 (49 CFR 571.108), S5/7, Conspicuity systems). This mandate is aimed at improving highway safety.

A common practice for meeting such Federal mandate is to apply conspicuity tape, which is commercially available from companies such as the 3M Company, to bumpers, under-ride bumpers, tail gates and sides of trailers and semitrailers.

A problem arises however from the corrosion effects of water, salt, abrasive materials and the like that will corrode metal surfaces on vehicles and degrade the adhesion of conspicuity tape to the metal surfaces. Failure to maintain the quality of the retroreflective sheeting frequently results in ticketing by highway patrol officers and the assessment of fines.

Replacement of missing or degraded conspicuity tape on bumpers typically requires sand blasting or grinding the bumper, application of a primer and paint, and application of new conspicuity tape. This can cost several hundred of dollars per bumper, plus the downtime for the trailer while the replacement process is completed.

SUMMARY OF THE INVENTION

The present invention provides a quick and inexpensive fix comprising easily attachable and detachable retroreflective plastic strips for replacing missing or damaged retroreflective tape on truck trailers and semitrailers. This invention provides a thin strip of plastic with retroreflective conspicuity tape on it and a system for quickly attaching the plastic strips to under-ride bumpers on trailers in any weather. It is preferably made such that water and air can flow through the plastic strip and thus minimize water being trapped against the under-ride bumper.

DETAILED DESCRIPTION OF PREFERRED EMBODIMENTS

Figure 1:
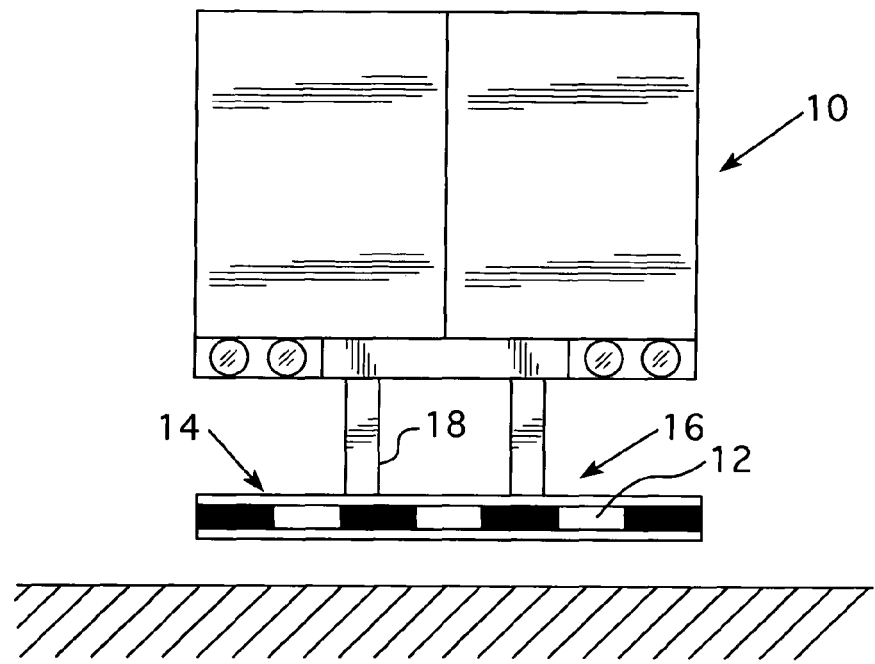
FIG. 1 is an elevation view of the rear of a truck trailer, sans the wheels and tires, showing a plastic strip of this invention with retroreflective conspicuity tape on it detachably secured on the trailer's under-ride bumper.

Referring to FIG. 1, the rear end of a truck trailer 10 is shown having an under-ride bumper 16 and a plastic strip of this invention with a strip of retroreflective conspicuity tape 12 adhesively bonded to the exposed rear face of the plastic strip. The conspicuity tape has alternating retroreflective white and red (shown as shaded) colors, which are easily seen by other drivers.

The under-ride bumper 16 on commercial trucks is required by Federal law to be not more than 22 inches above the road surface to stop passenger cars/vehicles from being driven under the trailer and thereby reduce the risk of serious injury or death to passengers in the cars.

Location of the under-ride bumper close to the road surface and at the rear of the trailer results in the under-ride bumper being highly exposed to salt and other harsh chemicals along with other road waste that can corrode the metal in the under-ride bumper. Such corrosion can degrade the bumpers and any retroreflective tape on the bumpers. Such degradation and/or loss of the retroreflective tape can occur rapidly and unexpectedly. Truck drivers are sometimes confronted with non-conforming vehicles while on the road and having no convenient way to rectify the problem.

The Federal law requires that under-ride bumpers extend horizontally to within 4 inches of the side of the truck and not beyond the sides of the truck. The distance between the bottom of the under-ride bumper must not exceed 22 inches at any point. The rear surface of the bumper must be within 12 inches of the rear surface of the truck, and the height of the bumper must be at least 3.94 inches.

Figure 2:
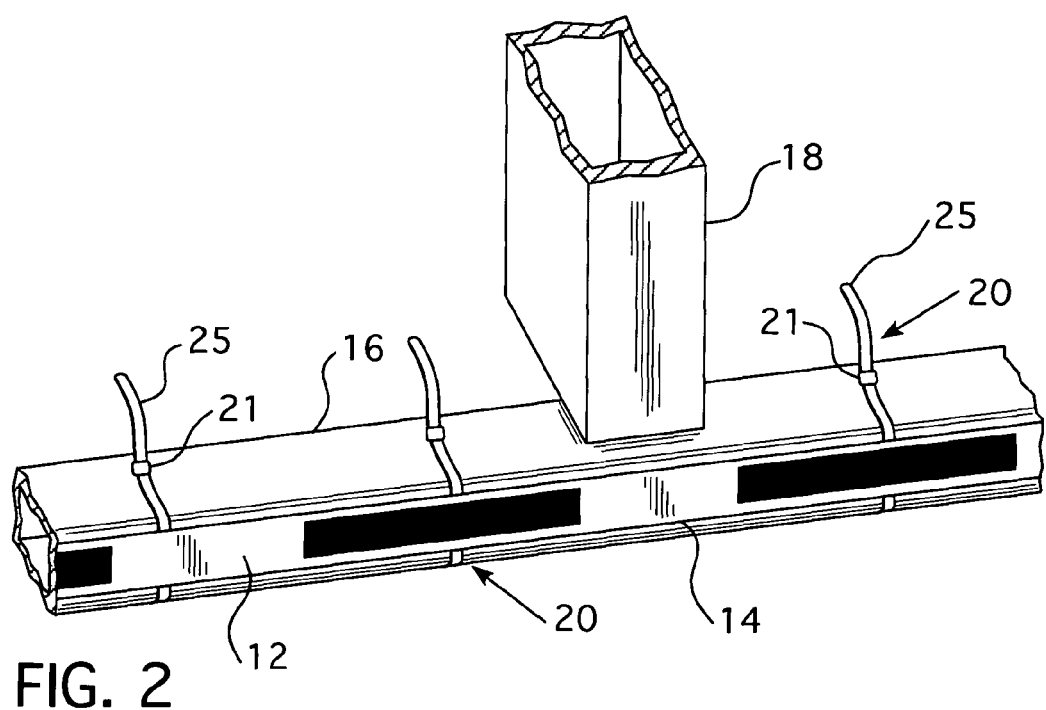
FIG. 2 is a larger perspective view of a portion of the under-ride bumper shown in FIG. 1 with plastic retroreflective plastic strip of this invention attached with zip ties, to the under-ride bumper.
Figure 3:
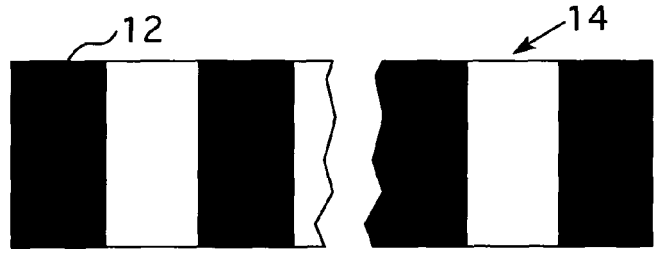
FIG. 3 is a fragmentary view of the front face of a plastic strip of this invention showing conspicuity tape on the strip.

FIG. 2 shows a retroreflective plastic strip 14 of this invention detachably secured to an under-ride bumper 16 with zip ties 20. As used herein, "detachably secured" means that the plastic strip can be detached from an under-ride bumper relatively easily. Zip ties 20 are readily available commercially in a variety of sizes and types from several companies including Panduit and Hellerman Tyton. Zip ties 20 used in this invention are preferably approximately 0.345×0.100 inches and 24 inches long. This invention preferably uses plastic zip ties but can use steel or stainless steel zip ties Zip ties 20 can be quickly and easily inserted through holes in the plastic strip (FIGS. 3-6) and locked around an under-ride bumper 16 The zip ties 20 in the plastic strip 14 used in this invention are preferably spaced about 4 inches apart. Plastic zip ties typically have a slotted end 21 with a locking tooth 23 and a transversely grooved end 25 for insertion into the slotted end and locking the ends together (See FIG. 6). When the grooved end 25 is inserted into the slotted end 21, the ends cannot be pulled apart without breaking the ends. This locking of the ends together can be done manually without need for a tool.

Figure 4:
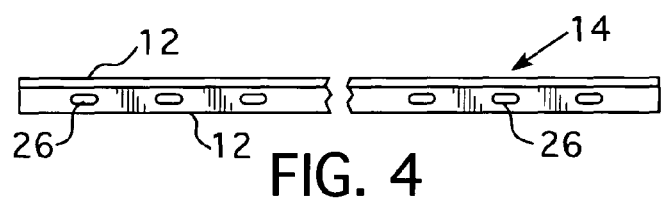
FIG. 4 is an edge view of the plastic strip of FIG. 3.
Figure 5:
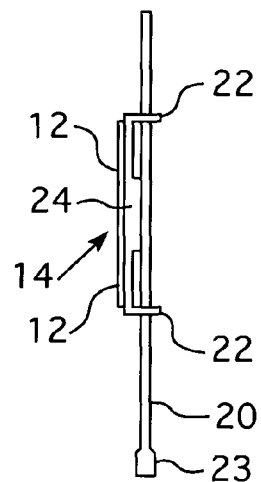
FIG. 5 is an end view of the plastic strip of FIGS. 3 and 4 and additionally showing a zip tie assembled with the plastic strip.
Figure 6:
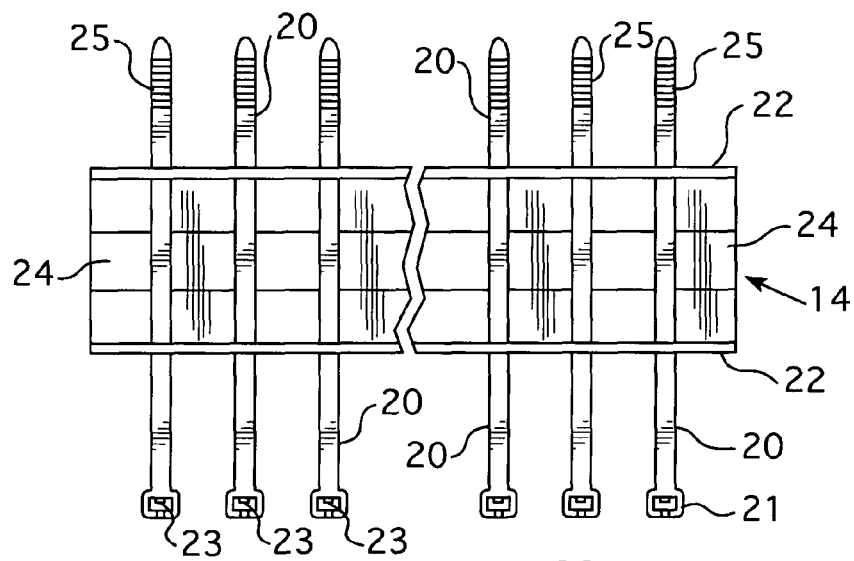
FIG. 6 is a fragmentary view of the back face of a plastic strip of this invention shown in FIGS. 3, 4, and 5 and additionally showing a plurality of zip ties assembled with the strip.

Referring to FIGS. 3-6, plastic strips 14 of this invention are preferably 2 inches wide and have a channel-like cross section with short flanges 22 along both longitudinal edges and an intermediate ridge/land 24 between the flanges as seen in FIGS. 5 and 6. The channel shape of the strip 14 serves to conserve plastic material, facilitate forming holes in the strip for receiving zip ties, and provide a gap for air flow that helps prevent the accumulation of water between the strip and the under-ride bumper.

The conspicuity strip 12 is adhesively bonded to the front face of the plastic strip 14. The plastic strip 14 is preferably substantially rigid so it will be minimally affected by wind and resist degradation by chemicals and abrasive materials that may impact against the strip. The plastic strip 14 is preferably extruded from poly vinyl chloride (PVC) but can also be made of polyethylene, polystyrene and polypropylene among other plastic materials. The plastic strips are preferably made of one homogeneous thickness of plastic but can be multi-layer of one or more different plastics.

FIG. 4 shows a plurality of holes 26 through both flanges 22 on the edges of the strip 14. The holes 26 in both edges are aligned diametrically along the strip, so zip ties 20 thought the holes in the flanges 22 will extend across the strip 14 perpendicular to the flanges and the centerline of the strip as seen in FIG. 6. The intermediate ridge/land 24 between the flanges preferably projects from the strip slightly less than the projection of the flanges 22 (FIG. 5) so the zip ties 20 will not cause the strip to bulge outwardly. Instead, front face of the strip 14 is substantially parallel to the face of the under-ride bumper. The primary purpose of the intermediate ridge 24 is to support the strip 14 when it is secured on an under-ride bumper with pop rivets as is described below.

FIG. 6 shows a plurality of zip ties 20 disposed through the holes in the flanges 22 on the strip 14. FIGS. 5 and 6 show the zip ties 20 shorter than actual dimensions for purpose of illustration. The zip ties are preferably at least 24 inches long in order to extend around a under-ride bumper and have their ends secured with the grooved end 25 locked in the slotted end 21 as seen in FIG. 2.

Figure 7:
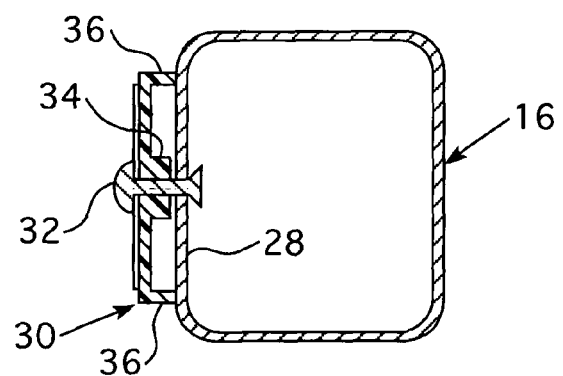
FIG. 7 is a cross sectional view through an under-ride bumper of a truck trailer and showing a plastic strip of this invention detachably secured to the bumper with a pop rivet.

FIG. 7 shows an alternative embodiment of this invention in which a retroreflective plastic strip 30 is riveted to an under-ride bumper 16. Strip 30 may have the same cross sectional channel shape as strip 14 in FIGS. 3-6, but does not require holes through the flanges 36. A plurality of rivets 32 are preferably inserted though holes drilled through the retroreflective strip 30 and through on wall 28 of the bumper 16. The rivet holes are preferably drilled on or near the centerline of the strip 30 and through the intermediate ridge 34. The holes are preferably spaced no more than 6 inches apart, but the spacing can vary depending on materials and design choices. The rivet heads are preferably about ¼ to ⅜ inch in diameter to secure the strip 30 to the bumper 16 or other vehicle surface and not tear out. The retroreflective strip 30 is trimmed flush with the end of the bumper 16 so the strip won't catch the wind. The plastic strip 30 can be easily detached from the bumper 16 by drilling out the pop rivets 32.

Metal screws, liquid adhesive or peelable adhesive can also be used to secure retroreflective plastic strips of this invention to bumpers and other surfaces of trailers. Adhesive suitable for this invention can be purchased from the 3M Company and other suppliers. Rivets and/or screws used in this invention should be either aluminum or stainless steel to minimize corrosion.

This invention also includes a kit comprising at least two retroreflective plastic strips approximately 2-4 feet or more in length and a supply of attachment means such as zip ties, rivets or screws for attaching the strips to a bumper or other surface on a trailer. The kit is adapted to be marketed in truck stops, service stations or the like for truckers to purchase them while on the road and unexpectedly confronted with a compliance issues due to missing or degraded retroreflective tape on their vehicles.

It is seen that this invention provides a new product and kit to facilitating an expedient way to correct missing and/or degraded retroreflective sheeting on truck trailers and semi-trailers. This invention can be used as a temporary or permanent compliance with the statutory requirements for retroreflective sheeting. The durable and easily attachable and detachable plastic retroreflective strips of this invention are inexpensive and cost effective. It will be apparent to those skilled in the art that numerous modifications can be made in the preferred embodiments of this invention, which have been selected for purposes of illustration, without departing from the spirit of the invention or the scope of the claims appended hereto. For example, a plastic of this invention can have a variety of cross sectional shapes such as rectangular with no channel, or be channel shaped with a rounded ridge between edge flanges. A flat rectangular strip could have a plurality of holes through it along both edges and colored zip ties could be used that would match the color of the conspicuity and be disposed across the exterior surface of the strip, through the holes and around an under-ride bumper.

The invention claimed is:

1. A vehicle for highway trucking having an under-ride bumper and a durable retroreflective plastic strip detachably secured to the rear surface of the under-ride bumper to enhance visibility of said vehicle, said retroreflective strip comprising a strip of plastic at least two inches in width and having conspicuity tape bonded to its exterior surface, said strip of plastic having a flange along both longitudinal edges extending laterally of the general plane of the strip on the side thereof opposite said conspicuity tape for supporting the strip spaced from said bumper.

2. A vehicle as set forth in claim 1 in which each said flange projects substantially perpendicular to the plane of the strip and has a plurality of holes therethrough with zip ties disposed through said holes and secured around said under-ride bumper.

3. A vehicle as set forth in claim 1 in which said plastic strip has an intermediate longitudinally extending ridge between said flanges.

4. A vehicle as set forth in claim 1 in which said plastic strip is made of plastic material selected from poly vinyl chloride, polyethylene, polystyrene and polypropylene.

5. A vehicle as set forth in claim 1 in which said retroreflective strip is attached to said under-ride bumper by means selected from zip ties, screws, adhesive and pop rivets.

6. A durable retroreflective strip comprising a strip of plastic having conspicuity tape adhesively bonded to one face of said strip of plastic, which is at least two inches in width and has a flange along both longitudinally extending edges projecting laterally from the general plane of the strip opposite from the face having said conspicuity tape bonded to it, said flanges adapted to space said retroreflective strip from an underlying support.

7. A durable retroreflective strip as set forth in claim 6 in which said strip of plastic is made of plastic material selected from polyvinyl chloride, polyethylene, polystyrene and polypropylene.

8. A durable retroreflective strip as set forth in claim 6 having an intermediate longitudinally extending ridge between said flanges.

9. A durable retroreflective strip as set forth in claim 6 in which said flanges project substantially perpendicular to said plastic strip and have a plurality of holes therethrough for receiving zip ties to attach said retroreflective strip to an underlying support.

10. A durable retroreflective strip as set forth in claim 6, which is made of plastic material selected from PVC, polyethylene, polystyrene and polypropylene.

11. A kit for attaching durable retroreflective strips to highway trucking vehicles to enhance visibility of said vehicles, said kit comprising at least two strips of plastic having retroreflective conspicuity tape bonded to one surface of each of said at least two strips, said strips of plastic each having a flange along both longitudinally extending edges of each strip projecting substantially perpendicular to the general plane of the strip opposite the face of the strip to which said conspicuity tape is bonded, and said kit further including means for detachably securing said strips to said vehicles, said means for securing selected from zip ties, rivets, adhesive and screws.

12. A kit as set forth in claim 11 in which said strips of plastic are made of plastic material selected from polyvinyl chloride, polyethylene, polystyrene and polypropylene.

13. A kit as set forth in claim 11 in which each said strip has a longitudinally extending intermediate ridge between said flanges.

14. A kit as set forth in claim 11 in which said flanges on each said strip have a plurality of holes through them for receiving zip ties for securing each strip to under-ride bumpers on vehicles.

* * * * *